US011454567B2

(12) United States Patent
Zhang et al.

(10) Patent No.: US 11,454,567 B2
(45) Date of Patent: Sep. 27, 2022

(54) FAULT DIAGNOSIS METHOD OF RECIPROCATING MACHINERY BASED ON KEYPHASOR-FREE COMPLETE-CYCLE SIGNAL

(71) Applicant: Beijing University of Chemical Technology, Beijing (CN)

(72) Inventors: Jinjie Zhang, Beijing (CN); Zhinong Jiang, Beijing (CN); Haipeng Zhao, Beijing (CN); Zhiwei Mao, Beijing (CN); Kun Chang, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 0 days.

(21) Appl. No.: 17/165,420

(22) Filed: Feb. 2, 2021

(65) Prior Publication Data

US 2021/0255059 A1      Aug. 19, 2021

(30) Foreign Application Priority Data

Feb. 19, 2020   (CN) .......................... 201911265409.5

(51) Int. Cl.
*G01M 13/00*        (2019.01)
(52) U.S. Cl.
CPC .................................. *G01M 13/00* (2013.01)
(58) Field of Classification Search
None
See application file for complete search history.

(56) References Cited

U.S. PATENT DOCUMENTS

| 2015/0255059 A1* | 9/2015 | Ide | .................... | G06F 16/683 |
| | | | | 704/254 |
| 2016/0026172 A1* | 1/2016 | Steele | ................ | G05B 19/4065 |
| | | | | 700/175 |

FOREIGN PATENT DOCUMENTS

JP            6199035 B2 *    9/2017    .............. F04B 51/00

OTHER PUBLICATIONS

Advanced Vibration Processing Techniques for Condition Monitoring and Quality Control in I.C. Enginesand Harvesting Machines, Ing. Simone Delvecchio, Mar. 2009 (Year: 2009).*
Detection of car abnormal vibration using machine learning, Wataru Hashimoto et al, 2019 IEEE International Symposium on Multimedia (ISM) (Year: 2019).*

* cited by examiner

*Primary Examiner* — Matthew G Marini
(74) *Attorney, Agent, or Firm* — M&B IP Analysts, LLC

(57) ABSTRACT

The present disclosure relates to a fault diagnosis method of a reciprocating machinery based on a keyphasor-free complete-cycle signal. The method includes the following steps: 1) building a complete-cycle vibration signal image library; 2) training an image recognition model; 3) acquiring a complete-cycle data on a keyphasor-free basis; 4) building an automatic feature extraction model; and 5) inputting a hidden layer feature of an autoencoder into a support vector machine (SVM) classifier to obtain a diagnosis result. By using a deep cascade convolutional neural network (CNN), the present disclosure achieves the goal of complete-cycle data acquisition on a keyphasor-free basis, solves the problems that traditional intelligent fault diagnosis relies on a keyphasor signal and real-time diagnosis fails due to insufficient installation space. In addition, by using an autoencoder for automatic feature extraction, the present disclosure avoids manual feature selection, reduces labor costs.

1 Claim, 6 Drawing Sheets

FAULT DIAGNOSIS METHOD OF RECIPROCATING MACHINERY BASED ON KEYPHASOR-FREE COMPLETE-CYCLE SIGNAL

TECHNICAL FIELD

The present disclosure belongs to the technical field of fault diagnosis of reciprocating machineries of emergency generating sets for vehicles, ships and nuclear power plants, and in particular relates to a fault diagnosis method of a reciprocating machinery based on a keyphasor-free complete-cycle signal, which can be used to diagnose an abnormal fault of the reciprocating machinery such as improper valve clearance in case a keyphasor or speed transducer can hardly be installed.

BACKGROUND

Reciprocating machinery is the core power unit of emergency generating sets for vehicles, ships and nuclear power plants, and its safe and reliable operation is indispensable for the normal running of the equipment. In order to prevent equipment failures and reduce the impact of failures, traditional regular and post-maintenance requires human experts to enter the site for empirical diagnosis and analysis. At present, a large number of real-time operating condition monitoring and maintenance technologies for the reciprocating machinery have been developed at home and abroad. Due to the excessive dependence of traditional intelligent diagnosis on keyphasor and speed signals, the existing monitoring and diagnosis methods still cannot meet the complex and growing diagnosis requirements of reciprocating machinery. The cylinder head vibration signal of the reciprocating machinery includes the information of key internal moving parts, which can be fully mined to reduce or get rid of restrictions by keyphasor and speed signals. Therefore, the development of a fault diagnosis method based on a keyphasor-free complete-cycle signal is of great significance for diagnosing typical faults of the reciprocating machinery such as improper valve clearance.

At present, there are mainly two methods used to acquire complete-cycle signals. One method is a keyphasor-based method, which includes the acquisition of angular-domain vibration signal based on a micro transducer, the zero-crossing detection of keyphasor signal cycle, the barycentric detection of keyphasor signal cycle and the synchronous complete-cycle resampling of rotor vibration signal by using differential and spline interpolation. The keyphasor-based acquisition method generally has the problem of phase loss. The other method is a keyphasor-free method, which is used for some equipment that is inconvenient to install a keyphasor transducer, including the time-domain synchronous averaging without a keyphasor signal. The keyphasor-free acquisition method is simple and convenient, and avoids the installation of a keyphasor measuring device, thus greatly reducing the cost. Therefore, it has attracted more and more attention. However, at present, both the keyphasor-based and keyphasor-free acquisition methods usually require an auxiliary device, and are complicated, costly, and greatly affected by the load.

SUMMARY

In order to solve the problem of dependence on a keyphasor signal or a complicated and costly auxiliary device, the present disclosure provides a fault diagnosis method of a reciprocating machinery based on a keyphasor-free complete-cycle signal. The present disclosure avoids the use of any external auxiliary device, and has a simple operation and high diagnostic accuracy. The present disclosure provides a cut-off method for acquiring a complete-cycle signal by mining effective information in a vibration signal, which avoids the use of an expensive and difficult-to-install keyphasor transducer. The present disclosure introduces an autoencoder for automatic feature extraction, which avoids manual intervention and achieves high robustness. The present disclosure further uses a support vector machine (SVM) for classification and recognition, and realizes the diagnosis of typical faults of the reciprocating machinery such as improver valve clearance.

To achieve the above purpose, the present disclosure provides a fault diagnosis method of a reciprocating machinery based on a keyphasor-free complete-cycle signal, where the method includes the following steps:

step 1: acquiring, by an online monitoring system of the reciprocating machinery, m groups of vibration acceleration data of a single cycle of a measuring point of a cylinder head in a normal state and an abnormal state respectively on a keyphasor basis to generate a normal data set $N_m$ and an abnormal data set $A_m$; normalizing each group of data in the two data sets by using a z-score method to obtain a processed normal data set $N'_m$ and abnormal data set $A'_m$; generating images with a size of h1×h2 from the m groups of data in the normal data set $N'_m$ to acquire a normal data image set $P_m$;

step 2: locating shock positions of an intake stroke, a compression stroke, a power stroke and an exhaust stroke according to keyphasor information of the reciprocating machinery; then, partitioning each image in the normal data image set $P_m$ into sub-images with a size of $$\frac{h1}{4} \times h2$$

according to an order of the intake stroke, the compression stroke, the power stroke and the exhaust stroke; labeling the sub-images to generate an intake stroke image set $J=\{j_1, j_2, j_3, \ldots, j_m\}$, a compression stroke image set $C=\{c_1, c_2, c_3, \ldots, c_m\}$, a power stroke image set $F=\{f_1, f_2, f_3, \ldots, f_m\}$ and an exhaust stroke image set $E=\{e_1, e_2, e_3, \ldots, e_m\}$; dividing the four stroke image sets into a training set and a test set respectively to obtain a training image set $Train\_C=\{J_{train}, C_{train}, F_{train}, E_{train}\}$ and a test image set $Test\_C=\{J_{test}, C_{test}, F_{test}, E_{test}\}$;

step 3: building and training a two-class hybrid convolutional neural network (CNN) Net;

3.1: representing categories of classification of the network Net by 0 and 1 respectively, where 0 indicates that an input data is not a complete-cycle data, and 1 indicates that the input data is a complete-cycle data; composing the network Net by an intake stroke CNN CNN_J, a compression stroke CNN CNN_C, a power stroke CNN CNN_F and an exhaust stroke CNN CNN_E; adopting a mean cross-entropy loss function $M_{loss}$ as follows:

$$M_{loss} = \frac{1}{k}\sum_{j=1}^{k} L^j(q_i)$$

$$L^j(q_i) = -[y_i \cdot \log_2(q_i) + (1-y_i) \cdot \log_2(1-q_i)]$$

where, $q_i \in [0,1]$ represents a predicted value of a one-dimensional vector corresponding to an i-th category; $L^j(q_i)$ represents a cross-entropy loss function for category i; k represents a count of CNNs; $y_i$ represents a true value of the i-th category; j represents a j-th CNN;

3.2: setting the four CNNs with the same network structure including an input layer, a convolution layer 1, a pooling layer 1, a convolution layer 2, a pooling layer 2, a fully connected layer 1 and a fully connected layer 2, where an input image in the input layer is a grayscale image of $$\frac{h1}{4} \times h2;$$

output results of the convolution layer 1, the pooling layer 1, the convolution layer 2 and the pooling layer 2 are respectively processed by batch normalization, and output results of the fully connected layer 1 and the fully connected layer 2 are respectively processed by L2 regularization;

3.3: denoting predicted probability values output by CNN_J, CNN_C, CNN_F and CNN_E as $g_J$, $g_C$, $g_F$, $g_E$ respectively, and taking a mean probability value g as a predicted probability value of the two-class hybrid CNN Net, where the mean probability value is calculated as follows:

$$g = \frac{g_J + g_C + g_F + g_E}{4}$$

inputting the training image set Train_C={$J_{train}$, $C_{train}$, $F_{train}$, $E_{train}$} into a built Net network model for training; testing a trained network model by using the test set Test_C={$J_{test}$, $C_{test}$, $F_{test}$, $E_{test}$} to obtain a final two-class hybrid CNN model which is denoted as T_Net; calculating a test accuracy as follows:

$$Acc = \frac{Corr}{Test\_m} \times 100\%$$

where, Corr represents a count of correct identification; Test_m represents a total count of test data;

step 4: acquiring a complete-cycle data of the reciprocating machinery on a keyphasor-free basis;

4.1: selecting a measuring point of the cylinder head of the reciprocating machinery, and continuously acquiring normal vibration acceleration data $S_n=\{s_1, s_2, s_3, \ldots, s_n\}$ and abnormal vibration acceleration data $Ab\_S_{n'}=\{ab\_s_1, ab\_s_2, ab\_s_3, \ldots, ab\_s_{n'}\}$ of two or more cycles on a keyphasor-free basis, where n and n' respectively represent a count of sampling points;

4.2: determining, according to a sampling frequency $F_s$ of the monitoring system and a working speed range [$R_{min}$, $R_{max}$] of a unit, a range of sampling point count [$W_{min}$, $W_{max}$] of a complete cycle as follows:

$$W_{min} = \frac{120}{R_{max}} \cdot F_s$$

$$W_{max} = \frac{120}{R_{min}} \cdot F_s$$

setting a series of window lengths $W_y=\{W_{min}, W_{min}+d, W_{min}+2d, \ldots, W_{min}+\alpha d\}$, $\alpha=0, 1, 2, \ldots$, that is, a total of $\alpha+1$ window lengths, according to [$W_{min}, W_{max}$], where d represents a gradient of length change; $W_{min}+\alpha d \leq W_{max}$, and $10 < d \leq W_{min}$;

4.3: performing sliding cut-off on data $S_n$ in window $W_{min}$ with a step Step to obtain a cut-off result $S_{n1}$; traversing data $S_n$ through the window to obtain a cut-off data set Cut1={$S_{n11}, S_{n12}, \ldots$}; normalizing data in Cut1 by the z-score method to obtain a data set Cut1'; generating images with a size of h1×h2 from each group of data in Cut1' respectively; partitioning each generated image from left to right into sub-images with a size of $$\frac{h1}{4} \times h2,$$

where a partitioning result of each image is denoted as $S_{n1\_P}$={img1,img2,img3,img4}; calculating the image set of each window in turn to obtain image sets Cut1_P={$S_{n11\_P}, S_{n12\_P}, \ldots$}, Cut2_P={$S_{n21\_P}, S_{n22\_P}, \ldots$}, ..., Cut($\alpha$+1)_P={$S_{n(\alpha+1)1\_P}, S_{n(\alpha+1)2\_P}, \ldots$};

4.4: sequentially selecting and inputting a first part of images in image set Cut1_P into T_Net for initial classification; continuing to classify a remaining image if the selected images include a complete-cycle image, where a data point corresponding to a complete-cycle image recognized by the classification of T_Net is a complete-cycle data, which is denoted as $zq_{i'}$; stopping classification of the remaining image in Cut1_P and switching to a next window, if the selected images do not include a complete-cycle image; calculating a count of images initially classified as follows:

$$Count = \frac{Win}{Step}$$

where, Win represents a window in $W_y$;

4.5: processing the image sets obtained by all windows according to the method in step 4.4 to finally obtain a normal complete-cycle data set T_zq={$zq_1, zq_2, zq_3, \ldots, zq_{i'}$}, i'=1, 2, 3, ... through keyphasor-free cut-off;

performing cut-off on abnormal data $Ab\_S_{n'}$ by steps 4.2 to 4.5 to obtain cut-off cycle data $ab\_zq_{i'}$, and finally obtaining an abnormal complete-cycle data set Ab_zq={$ab\_zq_1, ab\_zq_2, ab\_zq_3, \ldots, ab\_zq_{i'}$} through keyphasor-free cut-off;

step 5: building an automatic feature extraction model, that is, an autoencoder model; dividing the normal data $N_m$ and abnormal data $A_m$ of the vibration acceleration of the cylinder head acquired on a keyphasor basis into a training set Train and a test set Test, and labeling "normal" and "abnormal" respectively; building an autoencoder including an input layer, a hidden layer 1, a hidden layer 2, a hidden layer 3, a hidden layer 4 and an output layer; training an initial autoencoder model by the training set Train, and testing the model by the test set Test to obtain an autoencoder-based feature extraction model; and step 6: labeling the complete-cycle data sets T_zq and Ab_zq obtained in step 4 as "normal" and "abnormal", and then dividing the complete-cycle data sets into a training set and a test set respectively according to the same ratio; inputting the training set into the autoencoder model obtained in step 5; taking an intermediate hidden layer feature obtained by the autoencoder as an input into a support vector machine (SVM) model to train a two-class SVM model, which outputs "1" indicating normal or "0" indicating abnormal; classifying normal and abnormal complete-cycle signals of the reciprocating machinery by the two-class SVM model after training.

Compared with the traditional fault diagnosis technology, the present disclosure specifically has the following advantages:

1. According to inherent shock correlation characteristics reflected by cylinder head vibration signals in different strokes of the reciprocating machinery, the present disclosure explores a new way to acquire a complete-cycle signal without the need for a keyphasor device to acquire a keyphasor signal. The present disclosure proposes an adaptive cut-off window strategy to realize multi-scale quasi-cyclic image generation under single or variable working conditions. By fusing the existing advanced deep learning-convolutional neural network (DL-CNN) technology with the working characteristics of the reciprocating machinery, the present disclosure proposes a new deep cascade CNN model for complete-cycle vibration image recognition.

2. The fault diagnosis method proposed by the present disclosure can monitor the complete-cycle vibration signal without using a keyphasor device, and train a deep autoencoder model by using a complete-cycle vibration signal acquired on a keyphasor basis. By utilizing the model to mine the intrinsic features hidden in the vibration signal, the present disclosure achieves more stable, more abstract and more advanced feature extraction without human interference involved in feature design or feature selection.

3. The fault diagnosis method proposed by the present disclosure is convenient and simple, avoids phase lose, and has high cycle integrity and high diagnostic accuracy. It can be applied to diagnose typical faults of the reciprocating machinery (such as improper valve clearance and misfire), and can also be applied to complex units such as gas turbines and compressors.

DETAILED DESCRIPTION

The method of the present disclosure is described in detail with reference to the drawings and the actual cylinder head data of a diesel engine.

Figure 1:
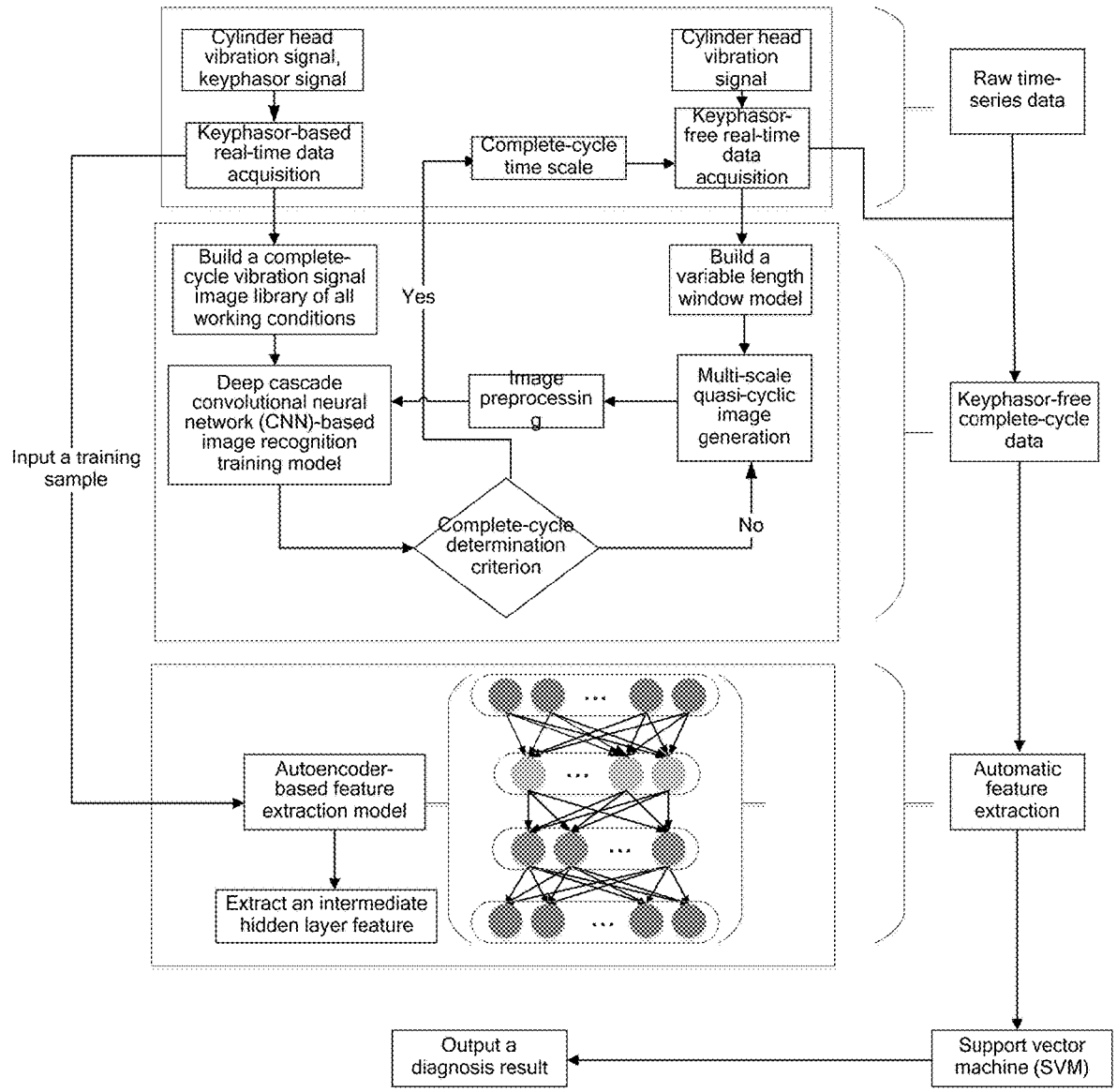
FIG. 1 is a flowchart of a method of the present disclosure.
Figure 2:
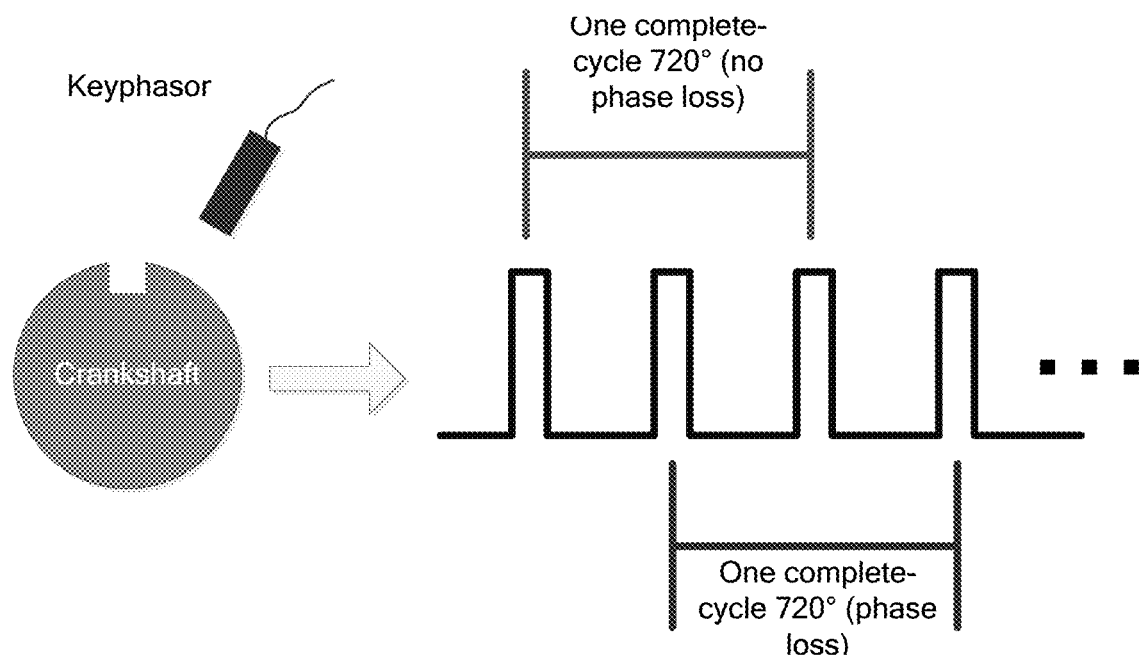
FIG. 2 shows a traditional keyphasor-based signal monitoring method.
Figure 3:
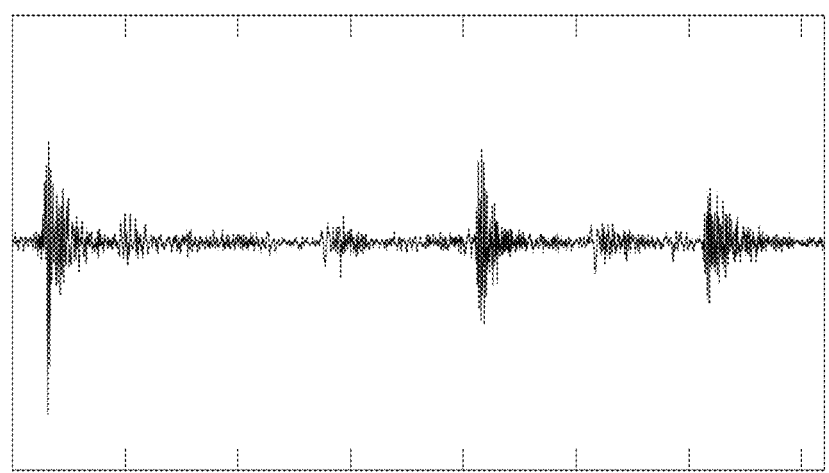
FIG. 3 shows a complete-cycle vibration signal acquired on a keyphasor basis under a working condition.

As shown in FIG. 1, a fault diagnosis method of a reciprocating machinery based on a keyphasor-free complete-cycle signal mainly includes a diagnosis process as follows:

Step 1: Build a complete-cycle vibration signal image library. FIG. 2 shows a traditional keyphasor-based signal monitoring method. It mainly uses a crankshaft groove or an external keyphasor module as a trigger, and a crankshaft rotates two revolutions, namely 720° to complete one operating cycle. A measuring point of a cylinder head is selected through a vibration transducer, and 500 groups of normal vibration acceleration data $N_m$ and abnormal valve clearance data $A_m$ of a complete cycle of the cylinder head under all possible working conditions are respectively acquired on a keyphasor basis. FIG. 3 shows a complete-cycle vibration signal acquired on a keyphasor basis under a working condition. According to different working conditions, different unit parameters and other characteristics, all data are normalized by using a z-score method, and images with a size of 1600×512 are generated, thereby generating a complete-cycle vibration signal image library $P_m$ of all working conditions as shown in FIG. 3.

Figure 4:
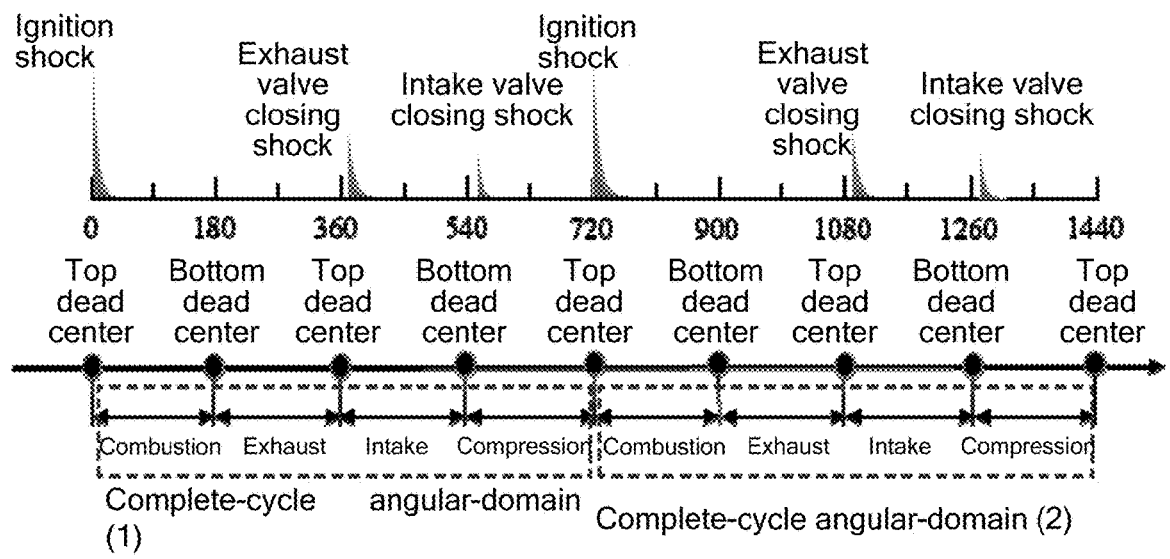
FIG. 4 shows a theoretical analysis of a complete-cycle shock feature of a vibration signal of a cylinder head.

Step 2: According to an actual working process of a diesel engine and an analysis of the acquired signal, the cylinder head vibration signal of the diesel engine mainly includes four strokes: intake, compression, combustion and exhaust. An ignition shock, an exhaust valve closing shock and an intake valve closing shock have the most significant characteristics, as shown in FIG. 4. It can be seen from the figure that each working process of the reciprocating machinery has a sequence, and has a corresponding specific relationship with a crankshaft rotation angle. Each image in the normal data image set $P_m$ is partitioned into sub-images with a size of 400×512. The sub-images are labeled to generate an intake stroke image set $J=\{j_1, j_2, j_3, \ldots, j_m\}$, a compression stroke image set $C=\{c_1, c_2, c_3, \ldots, c_m\}$, a combustion stroke image set $F=\{f_1, f_2, f_3, \ldots, f_m\}$ and an exhaust stroke image set $E=\{e_1, e_2, e_3, \ldots, e_m\}$. The four stroke image sets are divided into a training set and a test set respectively according to a ratio of 30% to 70% so as to generate a training image set Train_C=$\{J_{train}, C_{train}, F_{train}, E_{train}\}$ and a test image set Test_C=$\{J_{test}, C_{test}, F_{test}, E_{test}\}$.

Figure 5:
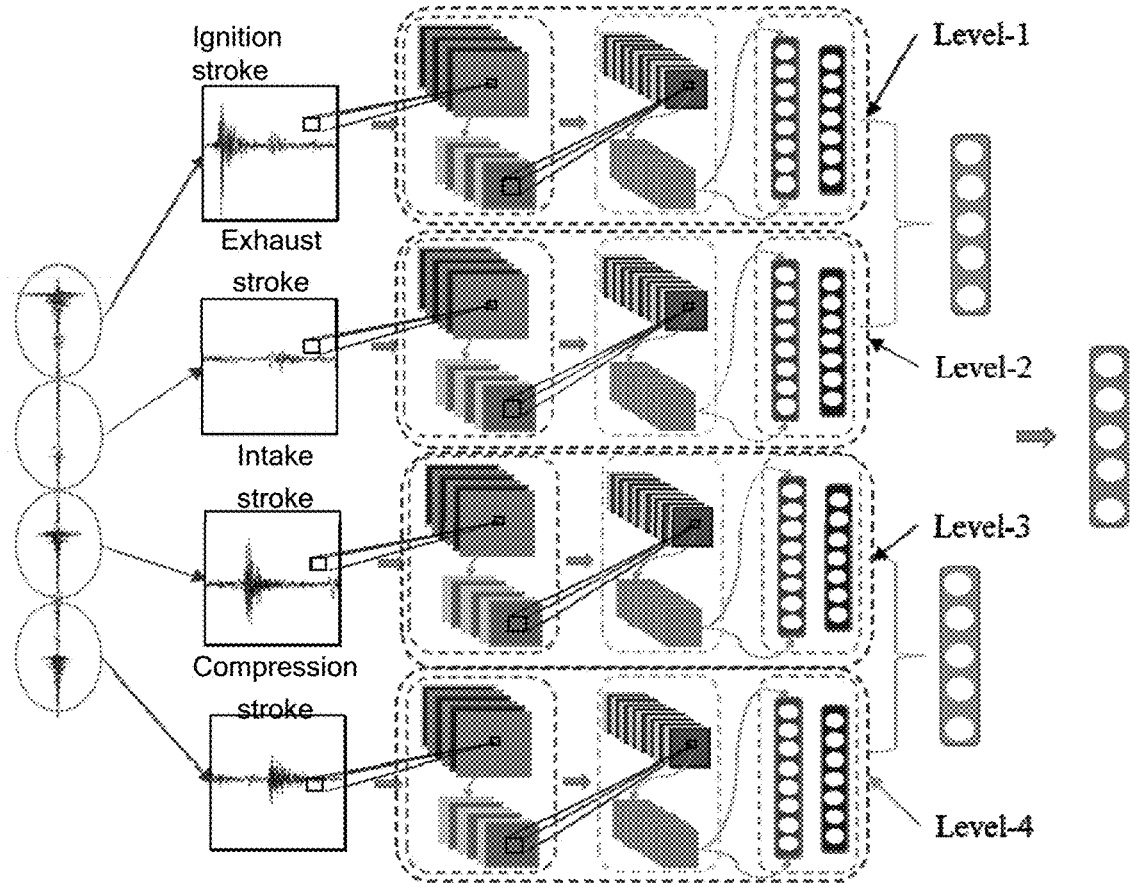
FIG. 5 shows an improved deep cascade convolutional neural network (CNN) model.

Step 3: Build and train a two-class hybrid convolutional neural network (CNN) Net, as shown in FIG. 5. The four CNNs have the same initial parameter, that is, a learning rate 1e-5. A convolution layer 1 and a convolution layer 2 respectively have 32 convolution kernels with a size of 3×3. Two pooling layers respectively adopt max pooling and have a 2×2 pooling kernel. A maximum number of iterations of the CNN is 120. The network is trained by the image training set and test set obtained in Step 2 to obtain a two-class hybrid CNN model T_Net. An accuracy is calculated as follows:

$$Acc = \frac{Corr}{Test\_m} \times 100\%$$

Step 4: Acquire a complete-cycle data of the reciprocating machinery on a keyphasor-free basis.

Figure 6:
FIG. 6 shows a raw signal acquired on a keyphasor-free basis under a working condition.

4.1: A measuring point of the cylinder head of the reciprocating machinery is selected, and normal vibration acceleration data $S_n=\{s_1, s_2, s_3, \ldots, s_n\}$ of two or more cycles are continuously acquired on a keyphasor-free basis, as shown in FIG. 6.

4.2: According to a sampling frequency 51200 of the monitoring system and a working speed range [600, 2100] of a unit, a range of sampling point count [2926,10240] of a complete cycle is determined as follows:

$$W_{min} = \frac{120}{R_{max}} \cdot F_s$$

$$W_{max} = \frac{120}{R_{min}} \cdot F_s$$

A series of window lengths $W_v=\{2926,2976,3026, \ldots, 10226\}$ are set according to [2926,10240], where d=50.

4.3: Sliding cut-off is performed on data $S_n$ in window 2926 with a step of 10 to obtain a cut-off result $S_{n1}$. The window traverses data $S_n$ through to obtain a cut-off data set Cut1=$\{S_{n11}, S_{n12}, \ldots\}$. Data in Cut1 are normalized by the z-score method to obtain a data set Cut1'. Images with a size of 1600×512 are generated from each group of data in Cut1' respectively. Each generated image is partitioned from left to right into sub-images with a size of 400×512, and a partitioning result of each image is denoted as $S_{n1\_P}=\{img1, img2, img3, img4\}$. The above process is repeated to obtain image sets of each window as follows:

Cut1_P=$\{S_{n11\_P}, S_{n12\_P}, \ldots\}$, Cut2_P=$\{S_{n21\_P}, S_{n22\_P}, \ldots\}, \ldots$, Cut($\alpha$+1)_P= $\{S_{n(\alpha+1)1\_P}, S_{n(\alpha+1)2\_P}, \ldots\}$ 4.4: A first part of images in image set Cut1_P are sequentially selected and input into T_Net for initial classification. If the selected images include a complete-cycle image, a remaining image is continuously classified, and a data point corresponding to the complete-cycle image obtained by the classification of T_Net is a complete-cycle data, which is denoted as $zq_{i'}$. If the selected images do not include a complete-cycle image, the classification of the remaining image in Cut1_P is stopped, and the operation switches to a next window. A count of images initially classified is calculated as follows:

$$\text{Count} = \frac{\text{Win}}{\text{Step}}$$

4.5: The image sets obtained by all windows are processed according to the method in Step 4.4 to finally obtain a complete-cycle data set T_zq=$\{zq_1, zq_2, zq_3, \ldots, zq_{i'}\}$, i'=1, 2, 3, . . . through keyphasor-free cut-off.

Figure 7:
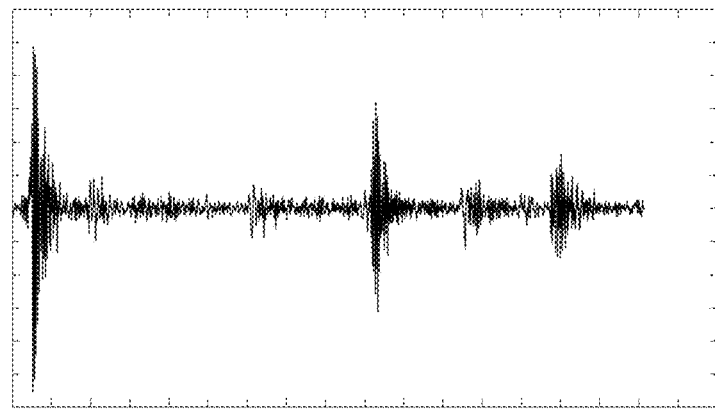
FIG. 7 shows a normal complete-cycle signal acquired on a keyphasor-free basis under a working condition according to the present disclosure.
Figure 8:
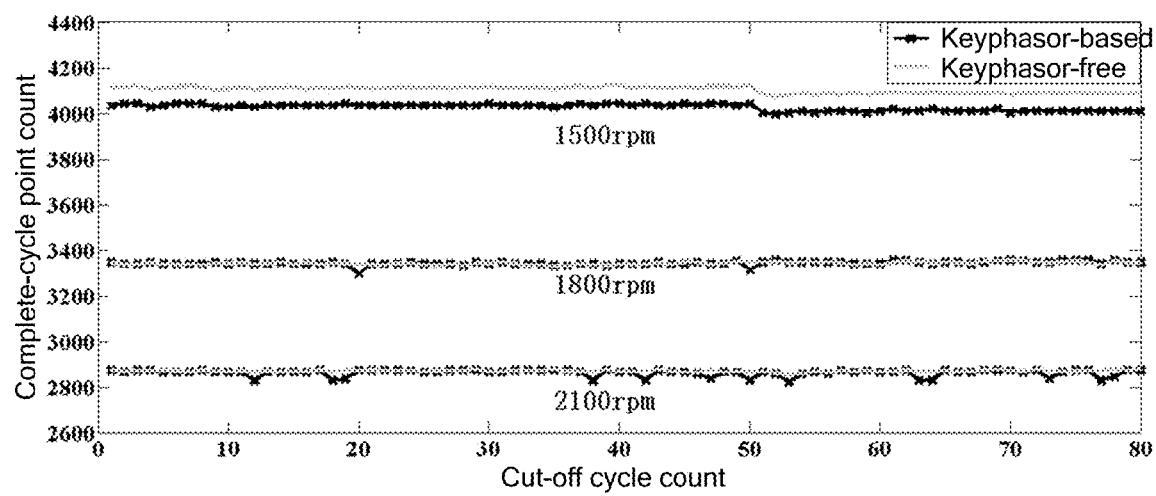
FIG. 8 shows a comparison of keyphasor-based and keyphasor-free complete-cycle lengths under different working conditions.
Figure 9:
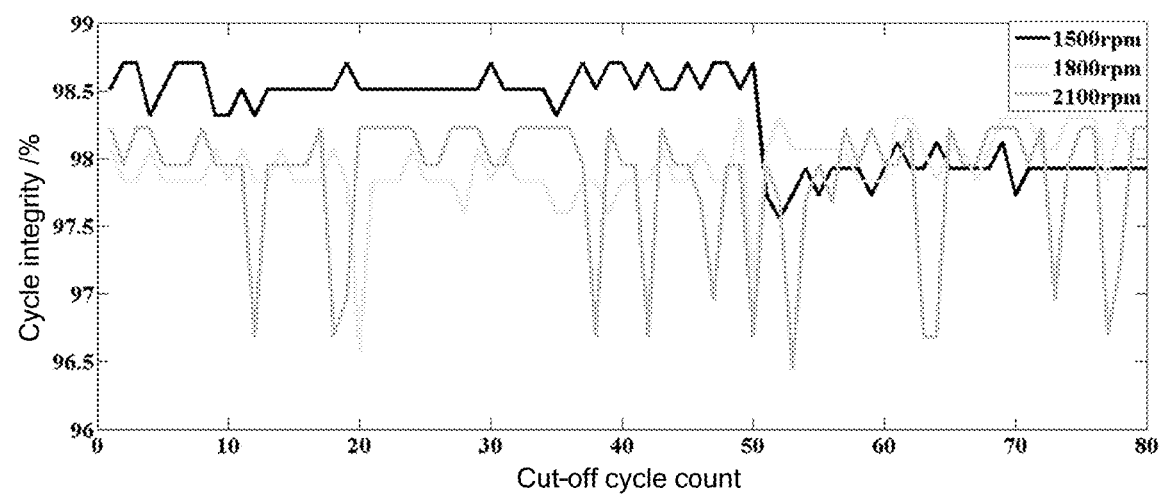
FIG. 9 shows a comparison of keyphasor-based and keyphasor-free complete-cycle integrities under different working conditions.

A keyphasor-free cut-off result of a complete-cycle signal is shown in FIG. 7, which is compared with a keyphasor-based complete-cycle result (FIG. 8), and a complete-cycle integrity of the keyphasor-free acquisition is above 96%. As shown in FIG. 9, there is only a slight difference between the two acquisitions. The complete-cycle integrity is calculated as follows:

$$w = \frac{N_{non}}{\frac{120}{n} \times F_s} \times 100\%$$

In the equation, $N_{non}$ represents a complete-cycle length acquired through keyphasor-free cut-off, and n represents a rotation speed.

Figure 10:
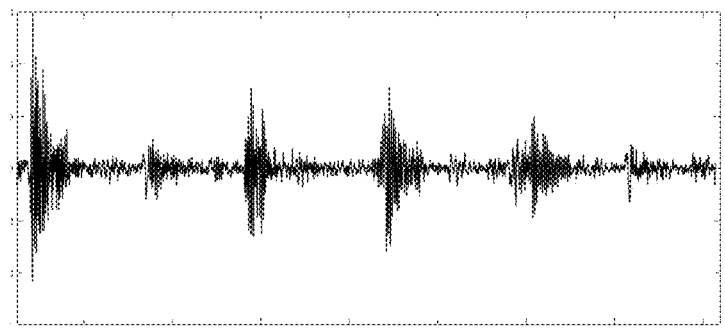
FIG. 10 shows a complete-cycle abnormal valve clearance signal acquired on a keyphasor-free basis under a working condition according to the present disclosure.

The same measuring point of the cylinder head of the reciprocating machinery is selected, and abnormal valve clearance-induced vibration acceleration data Ab_$S_n=\{ab\_s_1, ab\_s_2, ab\_s_3, \ldots, ab\_s_{n'}\}$ of two or more cycles are continuously acquired on a keyphasor-free basis. Ab_$S_{n'}$ is cut off according to Steps 4.2 to 4.4 with a cut-off cycle of ab_$zq_{i'}$ to finally obtain a complete-cycle abnormal data set Ab_zq=$\{ab\_zq_1, ab\_zq_2, ab\_zq_3, \ldots, ab\_zq_{i'}\}$ through keyphasor-free cut-off, as shown in FIG. 10.

Step 5: Build an automatic feature extraction model, that is, an autoencoder. The normal vibration acceleration data $N_m$ and the abnormal valve clearance data $A_m$ of the cylinder head acquired on a keyphasor basis are respectively divided into a training set Train and a test set Test according to a ratio of 70% to 30%, and the divided data sets are labeled "normal" and "abnormal" respectively. An autoencoder is built with an input layer, a hidden layer 1, a hidden layer 2, a hidden layer 3, a hidden layer 4 and an output layer. An initial parameter includes a learning rate 1e-5. The hidden layers 1 to 4 respectively have 800 nodes and maximally 200 iterations. An initial autoencoder model is trained by the training set Train, and the model after training is tested by the test set Test. An accuracy is calculated by the equation in Step 3. According to the accuracy, the learning rate of the model and the node count and maximum iterations in the hidden layers are adjusted, and then the model is again trained by the training set Train. The above process is repeated until the accuracy is the highest and the time consumed is the shortest, thus obtaining an autoencoder-based feature extraction model.

Figure 11:
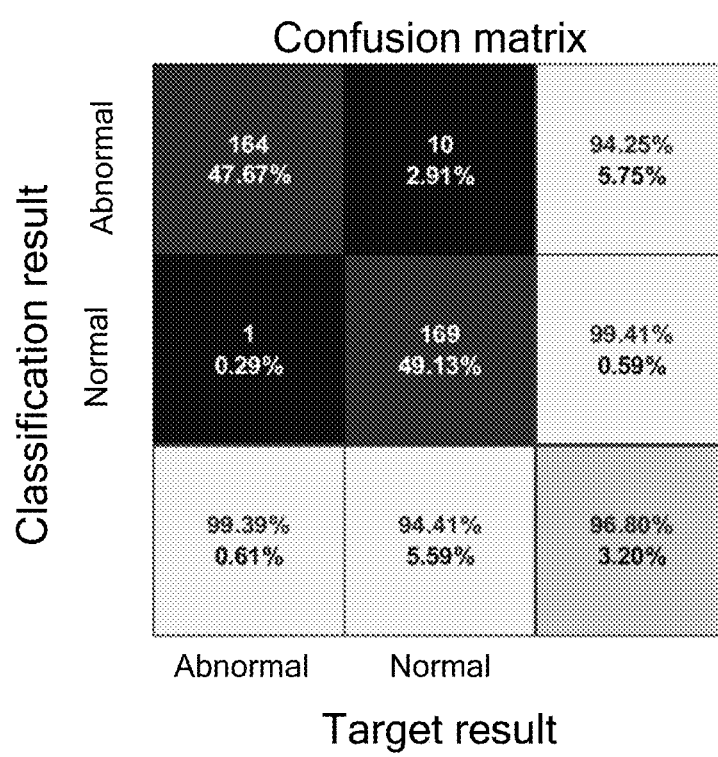
FIG. 11 shows a diagnosis result of a valve clearance fault of a reciprocating machinery.

Step 6: The complete-cycle data sets T_zq and Ab_zq obtained in Step 4 are labeled "normal" and "abnormal", and divided into a training set and a test set respectively according to a ratio of 70% to 30%. The training set is input into the autoencoder model obtained in Step 5, and an intermediate hidden layer feature obtained by the autoencoder is input into a support vector machine (SVM) model to train a two-class SVM model so as to finally determine whether the valve clearance of the diesel engine is abnormal. The model is tested by the test set, and a test result shown in FIG. 11 is obtained, which has an overall accuracy of 95% or above.

What is claimed is:

1. A fault diagnosis method of a reciprocating machinery based on a keyphasor-free complete-cycle signal, wherein the method comprises the following steps:

step 1: acquiring, by an online monitoring system of the reciprocating machinery, m groups of vibration acceleration data of a single cycle of a measuring point of a cylinder head in a normal state and an abnormal state respectively on a keyphasor basis to generate a normal data set $N_m$ and an abnormal data set $A_m$; normalizing each group of data in the two data sets by using a z-score method to obtain a processed normal data set $N'_m$ and abnormal data set $A'_m$; generating images with a size of h1×h2 from the m groups of data in the normal data set $N'_m$ to acquire a normal data image set $P_m$;

step 2: partitioning each image in the normal data image set $P_m$ into sub-images with a size of $$\frac{h1}{4} \times h2$$

according to an order of the intake stroke, the compression stroke, the power stroke and the exhaust stroke; labeling the sub-images to generate an intake stroke image set J=$\{j_1, j_2, j_3, \ldots, j_m\}$, a compression stroke image set C=$\{c_1, c_2, c_3, \ldots, c_m\}$, a power stroke image set F=$\{f_1, f_2, f_3, \ldots, f_m\}$ and an exhaust stroke image set E={$e_1,e_2,e_3, \ldots ,e_m$}; dividing the four stroke image sets into a training set and a test set respectively to obtain a training image set Train_C={$J_{train}$, $C_{train}$, $F_{train}$, $E_{train}$} and a test image set Test_C={$J_{test}$, $C_{test}$, $F_{test}$, $E_{test}$}, wherein partitioning is based on locating the shock positions of the intake stroke, the compression stroke, the power stroke, and the exhaust stroke in the vibration acceleration data;

step 3: building and training a two-class hybrid convolutional neural network (CNN) Net;

3.1: representing categories of classification of the network Net by 0 and 1 respectively, wherein 0 indicates that an input data is not a complete-cycle data, and 1 indicates that the input data is a complete-cycle data; composing the network Net by an intake stroke CNN CNN_J, a compression stroke CNN CNN_C a power stroke CNN CNN_E and an exhaust stroke CNN CNN_E; adopting a mean cross-entropy loss function $M_{loss}$ as follows:

$$M_{loss} = \frac{1}{k}\sum_{j=1}^{k} L^j(q_i)$$

$$L^j(q_i) = -[y_i \cdot \log_2(q_i) + (1-y_i) \cdot \log_2(1-q_i)]$$

wherein, $q_i \in [0,1]$ represents a predicted value of a one-dimensional vector corresponding to an i-th category; $L^j(q_i)$ represents a cross-entropy loss function for category i; k represents a count of CNNs; $y_i$ represents a true value of the i-th category; j represents a j-th CNN;

3.2: setting the four CNNs with the same network structure comprising an input layer, a convolution layer 1, a pooling layer 1, a convolution layer 2, a pooling layer 2, a fully connected layer 1 and a fully connected layer 2, wherein an input image in the input layer is a grayscale image of $$\frac{h1}{4} \times h2;$$

output results of the convolution layer 1, the pooling layer 1, the convolution layer 2 and the pooling layer 2 are respectively processed by batch normalization, and output results of the fully connected layer 1 and the fully connected layer 2 are respectively processed by L2 regularization;

3.3: denoting predicted probability values output by CNN_J, CNN_C, CNN_F and CNN_E as $g_J, g_C, g_F, g_E$ respectively, and taking a mean probability value g as a predicted probability value of the two-class hybrid CNN Net, wherein the mean probability value is calculated as follows:

$$g = \frac{g_J + g_C + g_F + g_E}{4}$$

inputting the training image set Train_C={$J_{train}$, $C_{train}$, $F_{train}$, $E_{train}$} into a built Net network model for training; testing a trained network model by using the test set Test_C={$J_{test}$, $C_{test}$, $F_{test}$, $E_{test}$} to obtain a final two-class hybrid CNN model which is denoted as T_Net; calculating a test accuracy as follows:

$$Acc = \frac{Corr}{Test\_m} \times 100\%$$

wherein, Corr represents a count of correct identification; Test_m represents a total count of test data;

step 4: acquiring a complete-cycle data of the reciprocating machinery on a keyphasor-free basis;

4.1: selecting a measuring point of the cylinder head of the reciprocating machinery, and continuously acquiring normal vibration acceleration data $S_n$={$s_1, s_2, s_3, \ldots, s_n$} and abnormal vibration acceleration data Ab_$S_n$={ab_$s_1$, ab_$s_2$, ab_$s_3$, $\ldots$, ab_$s_{n'}$} of two or more cycles on a keyphasor-free basis, wherein n and n' respectively represent a count of sampling points;

4.2: determining, according to a sampling frequency $F_s$ of the monitoring system and a working speed range [$R_{min}$, $R_{max}$] of a unit, a range of sampling point count [$W_{min}$, $W_{max}$] of a complete cycle as follows:

$$W_{min} = \frac{120}{R_{max}} \cdot F_s$$

$$W_{max} = \frac{120}{R_{min}} \cdot F_s$$

setting a series of window lengths $W_v$={$W_{min}, W_{min}+d, W_{min}+2d, \ldots, W_{min}+\alpha d$}, $\alpha=0,1,2,\ldots$, that is, a total of $\alpha+1$ window lengths, according to [$W_{min}, W_{max}$], wherein d represents a gradient of length change; $W_{min}+\alpha d \leq W_{max}$, and $10 < d \leq W_{min}$;

4.3: performing sliding cut-off on data $S_n$, in window $W_{min}$ with a step Step to obtain a cut-off result $S_{n1}$; traversing data $S_n$ through the window to obtain a cut-off data set Cut1={$S_{n11}, S_{n12}, \ldots$}; normalizing data in Cut1 by the z-score method to obtain a data set Cut1'; generating images with a size of h1×h2 from each group of data in Cut1' respectively; partitioning each generated image from left to right into sub-images with a size of $$\frac{h1}{4} \times h2,$$

wherein a partitioning result of each image is denoted as $S_{n1\_P}$={img1,img2,img3,img4}; calculating the image set of each window in turn to obtain image sets Cut1_$P$={$S_{n11\_P}, S_{n12\_P}, \ldots$}, Cut2_$P$={$S_{n21\_P}, S_{n22\_P}, \ldots$}, $\ldots$, Cut($\alpha$+1)_$P$={$S_{n(\alpha+1)1\_P}, S_{n(\alpha+1)2\_P}, \ldots$};

4.4: sequentially selecting and inputting a first part of images in image set Cut1_P into T_Net for initial classification; continuing to classify a remaining image if the selected images comprise a complete-cycle image, wherein a data point corresponding to a complete-cycle image recognized by the classification of T_Net is a complete-cycle data, which is denoted as $zq_i$; stopping classification of the remaining image in Cut1_P and switching to a next window, if the selected images do not comprise a complete-cycle image; calculating a count of images initially classified as follows:

$$\text{Count} = \frac{\text{Win}}{\text{Step}}$$

wherein, Win represents a window in $W_y$;

4.5: processing the image sets obtained by all windows according to the method in step 4.4 to finally obtain a normal complete-cycle data set $T\_zq=\{zq_1, zq_2, zq_3, \ldots, zq_{i'}\}, i'=1,2,3,$ through keyphasor-free cut-off; performing cut-off on abnormal data $Ab\_S_{n'}$ by steps 4.2 to 4.5 to obtain cut-off cycle data $ab\_zq_{i'}$, and finally obtaining an abnormal complete-cycle data set $Ab\_zq=\{ab\_zq_1, ab\_zq_2, ab\_zq_3, \ldots, ab\_zq_{i'_n}\}$ through keyphasor-free cut-off;

step 5: building an automatic feature extraction model, that is, an autoencoder model, wherein the automatic feature extraction model provides a plurality of hidden layers of a keyphasor-free vibration signal; dividing the normal data $N_m$ and abnormal data $A_m$ of the vibration acceleration of the cylinder head acquired on a keyphasor basis into a training set Train and a test set Test, and labeling "normal" and "abnormal" respectively; building an autoencoder comprising an input layer, a hidden layer 1, a hidden layer 2, a hidden layer 3, a hidden layer 4 and an output layer; training an initial autoencoder model by the training set Train, and testing the model by the test set Test to obtain an autoencoder-based feature extraction model;

step 6: labeling the complete-cycle data sets T_zq and Ab_zq obtained in step 4 as "normal" and "abnormal", and then dividing the complete-cycle data sets into a training set and a test set respectively according to the same ratio; inputting the training set into the autoencoder model obtained in step 5; taking an intermediate hidden layer feature obtained by the autoencoder as an input into a support vector machine (SVM) model to train a two-class SVM model, which outputs "1" indicating normal or "0" indicating abnormal;

step 7: classifying normal and abnormal keyphasor-free complete-cycle signals of the reciprocating machinery by the two-class SVM model after training to perform fault diagnosis on a keyphasor-free complete-cycle signal of a reciprocating machinery; and Step 8: gathering the keyphasor-free vibration signal of the reciprocating machinery, and determining fault of the reciprocating machinery based on the abnormal output of the trained two-class SVM model, wherein the complete-cycle data is acquired by performing cut-off steps of 4.2 to 4.5 on the gathered keyphasor-free vibration signal, and wherein the acquired complete-cycle data is input into the trained two-class SVM model.

* * * * *